O. A. KERSEY.
COOLER.
APPLICATION FILED MAY 15, 1909.
958,931.
Patented May 24, 1910.
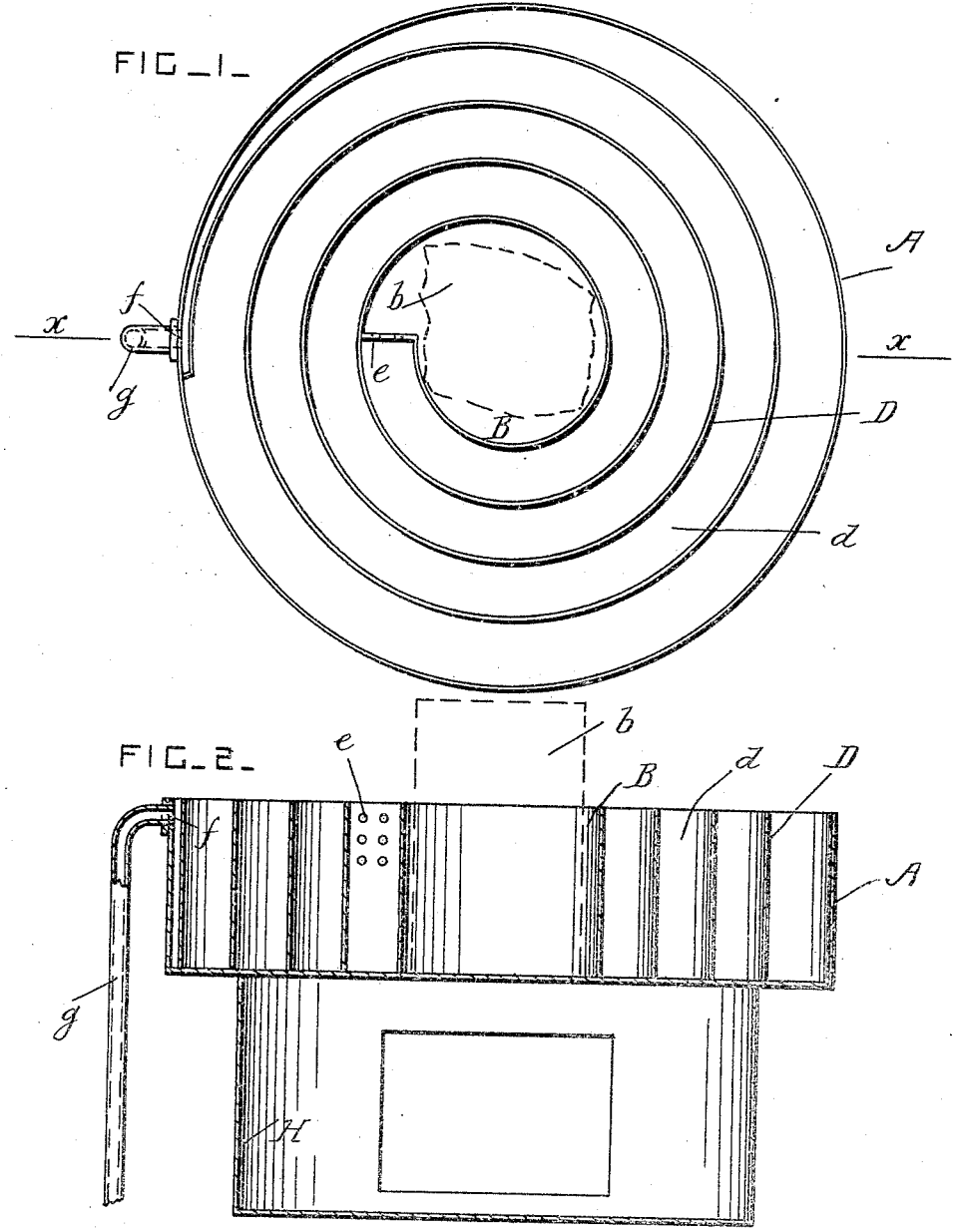

UNITED STATES PATENT OFFICE.

OTIS AUBRY KERSEY, OF PULASKI, TENNESSEE.

COOLER.

958,931.

Specification of Letters Patent. Patented May 24, 1910.

Application filed May 15, 1909. Serial No. 496,208.

*To all whom it may concern:*

Be it known that I, OTIS AUBRY KERSEY, a citizen of the United States, residing at Pulaski, in the county of Giles and State of Tennessee, have invented certain new and useful Improvements in Coolers; and I do hereby declare the following to be a full, clear, and exact description of the invention, such as will enable others skilled in the art to which it appertains to make and use the same.

This invention relates to coolers for bottles of beer, milk, soda-water, and other similar articles; and it consists in the novel construction and combination of the parts hereinafter fully described and claimed.

In the drawings, Figure 1 is a plan view of the cooler. Fig. 2 is a cross-section through the cooler, taken on the line $x$—$x$ in Fig. 1.

A is a vessel or tub for holding cooling water, provided at its center portion with a space or compartment B for holding a block of ice $b$ indicated by dotted lines.

D is a spirally arranged partition secured in the vessel A around the space for the ice. This partition forms a spiral channel $d$ for cooling water, and the articles to be cooled, such as bottles of milk, are placed in the water in this channel.

One end portion of the partition, next to the ice compartment, is provided at its upper part with an inlet perforation or opening $e$ or a series of such perforations, and these perforations are arranged at the upper part of the partition near its top edge. The other end portion of the channel $d$ from the inlet is provided with an outlet $f$ also arranged at its upper part, and this outlet $f$ preferably communicates with an outlet-pipe $g$.

H is a compartment under the vessel A which forms a support for it, and which may be used as a refrigerator chamber for food.

As the ice melts, the ice cold water flows through the inlet $e$ into the spiral channel and cools the bottles of milk in the channel. The coldest water sinks to the bottom of the channel from the inlet $e$, and as the water becomes warmer by contact with the bottles it rises, and it also passes around the spiral channel to the outlet $f$. As the outlet $f$ is at the upper part of the channel, the channel is kept nearly full of water, and the warmer water passes off slowly down the outlet pipe.

What I claim is:

A cooler comprising an open-topped vessel provided with a single spiral partition which forms a central chamber for holding water and the lower part of a block of ice and which also forms a single spiral cooling chamber for water and the objects to be cooled, the inner end portion of the said partition having at its upper part a series of small perforations for the passage of ice-cold water from the central chamber to the cooling chamber, and the said cooling chamber having an outlet for comparatively warm water formed in the upper part of the periphery of the said vessel.

In testimony whereof I have affixed my signature in the presence of two witnesses.

OTIS AUBRY KERSEY.

Witnesses:
GUY YOUNG,
LOYD DOUD.